US012567065B2

(12) United States Patent
Zhou

(10) Patent No.: US 12,567,065 B2
(45) Date of Patent: *Mar. 3, 2026

(54) BLOCKCHAIN-BASED DATA VERIFICATION SYSTEM AND METHOD, COMPUTING DEVICE AND STORAGE MEDIUM

(71) Applicant: Advanced New Technologies Co., Ltd., Grand Cayman (KY)

(72) Inventor: Fan Zhou, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,706

(22) Filed: Apr. 4, 2023

(65) Prior Publication Data

US 2023/0245121 A1 Aug. 3, 2023

Related U.S. Application Data

(60) Division of application No. 17/337,254, filed on Jun. 2, 2021, now Pat. No. 11,625,718, which is a
(Continued)

(30) Foreign Application Priority Data

Mar. 19, 2019 (CN) .......................... 201910206884.9

(51) Int. Cl.
| | |
|---|---|
| *G06Q 40/00* | (2023.01) |
| *G06Q 20/38* | (2012.01) |
| *G06Q 20/40* | (2012.01) |

(52) U.S. Cl.
CPC ......... *G06Q 20/401* (2013.01); *G06Q 20/389* (2013.01)

(58) Field of Classification Search
CPC .. G06Q 20/401; G06Q 20/389; G06Q 20/023; G06Q 20/0655; G06Q 20/10;
(Continued)

(56) References Cited

U.S. PATENT DOCUMENTS

| | | |
|---|---|---|
| 10,749,865 B2 | 8/2020 | Andrade |
| 2008/0034231 A1 | 2/2008 | Ginter et al. |

(Continued)

FOREIGN PATENT DOCUMENTS

| | | |
|---|---|---|
| CA | 3048743 A1 | 11/2018 |
| CN | 103605703 A | 2/2014 |

(Continued)

OTHER PUBLICATIONS

Hardjono et al: "Towards a Design Philosophy for Interoperable Blockchain Systems", MIT Connection Science, Massachusetts Institute of Technology, Cambridge, MA, May 16, 2018 (Year: 2018).*

(Continued)

*Primary Examiner* — Edward J Baird
(74) *Attorney, Agent, or Firm* — Seed IP Law Group LLP

(57) ABSTRACT

The present specification provides a blockchain-based data verification system and method, a computing device, and a storage medium. The blockchain-based data verification system includes: a first verification system, a second verification system, and a first blockchain node and a second blockchain node on a blockchain network; the first verification system is configured to: collect first service data based on a predetermined condition and generate a first verification file including the first service data, and send a verification request to the second verification system; the second verification system is configured to: receive the verification request, verify the first service data with second service data in a local database of the second verification
(Continued)

system, generate and send a verification result notification to the first verification system, and send successfully verified second service data in the local database to the first blockchain node on the blockchain network; wherein the first verification system is further configured to: receive the verification result notification, and send successfully verified first service data to the second blockchain node on the blockchain network.

20 Claims, 7 Drawing Sheets

Related U.S. Application Data continuation of application No. PCT/CN2020/070648, filed on Jan. 7, 2020.

(58) Field of Classification Search
CPC .. G06Q 20/3821; G06Q 20/405; G06Q 40/00; G06Q 40/04; G06Q 40/12; H04M 15/47; H04M 15/48; G06F 16/23; G06F 16/9024
See application file for complete search history.

(56) References Cited

U.S. PATENT DOCUMENTS

| | | | |
|---|---|---|---|
| 2014/0143889 A1 | 5/2014 | Ginter et al. | |
| 2017/0300978 A1 | 10/2017 | Narasimhan et al. | |
| 2018/0204281 A1* | 7/2018 | Painter | G06Q 30/0641 |
| 2018/0260909 A1 | 9/2018 | Li | |
| 2018/0337787 A1* | 11/2018 | Uhr | G06Q 20/02 |
| 2018/0374173 A1 | 12/2018 | Chen et al. | |
| 2019/0089717 A1 | 3/2019 | Dolev et al. | |
| 2019/0180274 A1* | 6/2019 | Johnson | G06Q 20/027 |
| 2019/0228391 A1 | 7/2019 | Hu et al. | |
| 2019/0251199 A1* | 8/2019 | Klianev | G06Q 40/04 |
| 2019/0253257 A1* | 8/2019 | Yan | G06F 16/235 |
| 2019/0268138 A1 | 8/2019 | Mankovskii et al. | |
| 2019/0288854 A1* | 9/2019 | Xie | H04L 9/0891 |
| 2020/0007343 A1* | 1/2020 | Evans | H04L 9/0643 |
| 2020/0118131 A1* | 4/2020 | Diriye | H04L 9/3239 |
| 2020/0142682 A1 | 5/2020 | Marks et al. | |
| 2020/0193429 A1* | 6/2020 | Babar | H04L 9/3239 |
| 2020/0242600 A1 | 7/2020 | Stack et al. | |
| 2020/0265530 A1 | 8/2020 | Lee et al. | |
| 2020/0273043 A1 | 8/2020 | Murphy et al. | |
| 2021/0073212 A1 | 3/2021 | Conley et al. | |
| 2021/0342940 A1* | 11/2021 | Dossa | G06Q 20/223 |

FOREIGN PATENT DOCUMENTS

| | | | | |
|---|---|---|---|---|
| CN | 106097092 A | 11/2016 | | |
| CN | 107451136 A | 12/2017 | | |
| CN | 107516221 A | 12/2017 | | |
| CN | 108133008 A | 6/2018 | | |
| CN | 108694664 A | 10/2018 | | |
| CN | 109299038 A | 2/2019 | | |
| CN | 110070359 A | 7/2019 | | |
| JP | 2003044663 A | 2/2003 | | |
| WO | WO 2019060827 A1 | 3/2019 | | |
| WO | WO-2019125506 A1 * | 6/2019 | | G06Q 20/389 |

OTHER PUBLICATIONS

Li et al. "Blockchain-based Security Architecture for Distributed Cloud Storage", 2017 IEEE International Symposium on Parallel and Distributed Processing with Applications and 2017 IEEE International Conference on Ubiquitous Computing and Communications (ISPA/IUCC, 2017.

* cited by examiner

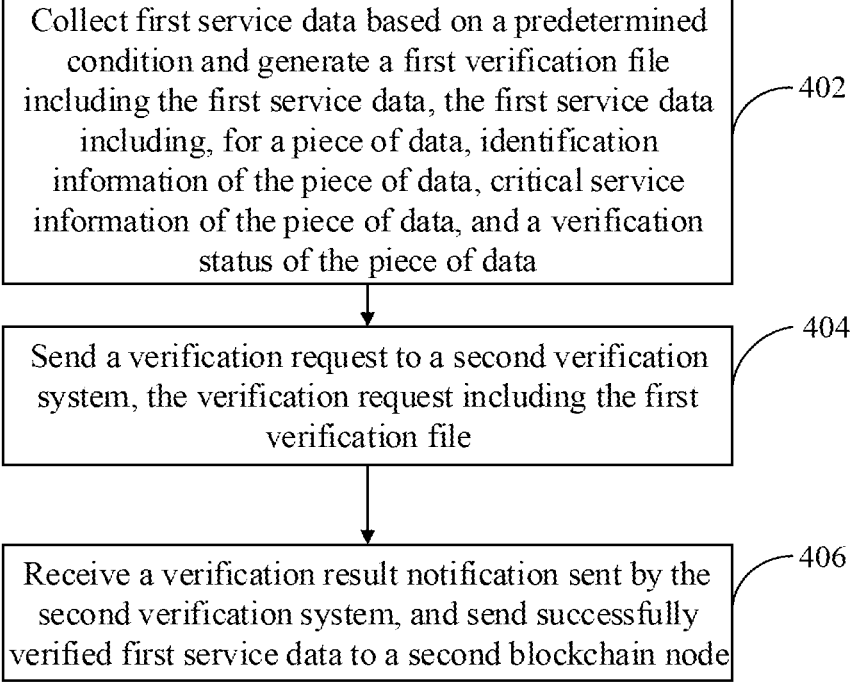

Collect first service data based on a predetermined condition and generate a first verification file including the first service data, the first service data including, for a piece of data, identification information of the piece of data, critical service information of the piece of data, and a verification status of the piece of data — 402

Send a verification request to a second verification system, the verification request including the first verification file — 404

Receive a verification result notification sent by the second verification system, and send successfully verified first service data to a second blockchain node — 406

*Fig. 4*

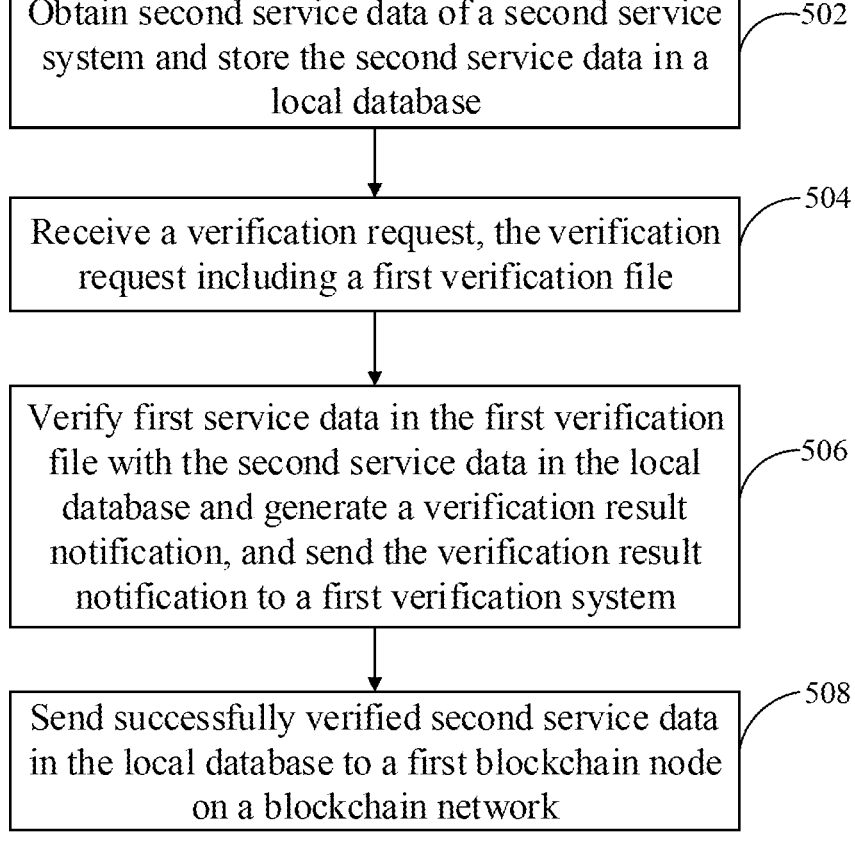

Obtain second service data of a second service system and store the second service data in a local database ⎯502

Receive a verification request, the verification request including a first verification file ⎯504

Verify first service data in the first verification file with the second service data in the local database and generate a verification result notification, and send the verification result notification to a first verification system ⎯506

Send successfully verified second service data in the local database to a first blockchain node on a blockchain network ⎯508

*Fig. 5*

BLOCKCHAIN-BASED DATA VERIFICATION SYSTEM AND METHOD, COMPUTING DEVICE AND STORAGE MEDIUM

TECHNICAL FIELD

The present specification relates to the field of blockchain technologies, and in particular, to a blockchain-based data verification system and method, a computing device and a storage medium.

BACKGROUND

With the development of Internet technologies, financial institutions and transaction platforms are becoming more diverse. Therefore, transaction data between financial institutions or between a transaction platform and a financial institution needs to be verified regularly to identify data differences of a same transaction in different institutions.

In the existing technologies, a data processing method between institutions is that institution A packages and sends transaction data generated in a predetermined time period to institution B, and institution B verifies the data in the file package. However, development costs of verification methods used in the existing technologies are high, involving data export from a core service system, file transmission, and data comparison with the core service system. It will take a long time to complete a whole process if a transaction volume in a verification cycle is large, resulting in poor timeliness. Therefore, it is difficult to achieve real-time or on-time verification, and there is a lack of an arbitration mechanism, for data verified in an existing way, that can be recognized by both parties if there is a dispute in the future.

SUMMARY

The implementations of the present specification provide a blockchain-based data verification system and method, a computing device and a storage medium, so as to overcome technical deficiencies existing in the existing technologies.

According to a first aspect of some implementations of the present specification, a blockchain-based data verification system is provided, including: a first verification system, a second verification system, and a first blockchain node and a second blockchain on a blockchain network, where the first verification system is configured to: collect first service data based on a predetermined condition and generate a first verification file including the first service data, and send a verification request to the second verification system, the verification request including the first verification file; the second verification system is configured to: receive the verification request, verify the first service data in the first verification file with second service data in a local database of the second verification system and generate a verification result notification, send the verification result notification to the first verification system, and send successfully verified second service data in the local database to the first blockchain node on the blockchain network; the first verification system is further configured to: receive the verification result notification, and send successfully verified first service data to the second blockchain node on the blockchain network; the first blockchain node corresponds to a node of the blockchain network and is configured to receive and store the successfully verified second service data that is sent by the second verification system; and the second blockchain node corresponds to a node of the blockchain network and is configured to receive and store the successfully verified first service data that is sent by the first verification system.

In some implementations, the blockchain-based data verification system further includes a first service system and a second service system; the first service system is configured to send the first service data to the first verification system, and the first service data includes, for a piece of data, identification information of the piece of data, critical service information of the piece of data, and a verification status of the piece of data; the second service system is configured to send the second service data to the second verification system, and the second service data includes, for a piece of data, identification information of the piece of data, critical service information of the piece of data, and a verification status of the piece of data; and the second verification system is further configured to receive the second service data of the second service system and store the second service data in the local database.

In some implementations, the second verification system is further configured to: determine a verification rule corresponding to the second service data based on the second service data, determine a mapping relationship between the second service data and the verification rule, and store the mapping relationship between the second service data and the verification rule in the local database.

In some implementations, the first verification system is further configured to: obtain the first service data, store N pieces of the first service data as the first verification file in response to a number of pieces of the first service data reaching a predetermined threshold N and process the first verification file to generate a first digital digest, and send the verification request to the second verification system, the verification request including the first verification file and the first digital digest corresponding to the first verification file.

In some implementations, the second verification system is further configured to: receive the verification request, extract the first digital digest from the verification request, and validate the first service data in the first verification file based on the first digital digest; and in response to the validating the first service data succeeding, determine the second service data corresponding to the first service data based on the identification information in the first service data, obtain the verification rule corresponding to the critical service information in the second service data, verify the first service data with the second service data in the local database based on the verification rule and generate the verification result notification, and send the verification result notification to the first verification system.

In some implementations, the second verification system is further configured to: verify the first service data with the second service data in the local database based on the verification rule, generate a second verification file based on a result of the verifying the first service data with the second service data and process the second verification file to generate a second digital digest, and send the verification result notification to the first verification system, the verification result notification including the second verification file and the second digital digest corresponding to the second verification file.

In some implementations, the first verification system is further configured to: extract the second verification file and the second digital digest that are included in the verification result notification, validate the second verification file based on the second digital digest, and in response to the validating the second verification file succeeding, extract and upload the successfully verified first service data in the second verification file to the blockchain network.

In some implementations, the first verification system is further configured to: if unsuccessfully verified first service data exists in the second verification file, update the verification status of the unsuccessfully verified first service data and review or report the unsuccessfully verified first service data.

According to another aspect of some implementations of the present specification, a blockchain-based data verification method is provided, where the method is applied to a first verification system, and includes: collecting first service data based on a predetermined condition and generating a first verification file including the first service data, the first service data including, for a piece of data, identification information of the piece of data, critical service information of the piece of data, and a verification status of the piece of data; sending a verification request to a second verification system, the verification request including the first verification file; and receiving a verification result notification sent by the second verification system, and sending successfully verified first service data to a second blockchain node.

In some implementations, collecting the first service data based on the predetermined condition and generating the first verification file including the first service data includes: obtaining first service data of a first service system; storing N pieces of the first service data as the first verification file in response to a number of pieces of the first service data reaching a predetermined threshold N, and processing the first verification file to generate a first digital digest; and sending the verification request to the second verification system, the verification request including the first verification file and the first digital digest corresponding to the first verification file.

In some implementations, the verification result notification includes a second verification file and a second digital digest corresponding to the second verification file; receiving the verification result notification sent by the second verification system, and sending the successfully verified first service data to the second blockchain node includes: extracting the second verification file and the second digital digest that are included in the verification result notification, and validating the second verification file based on the second digital digest; in response to the validating the second verification file succeeding, extracting and uploading the successfully verified first service data in the second verification file to the second blockchain node on the blockchain network; and if unsuccessfully verified first service data exists in the second verification file, updating the verification status of the unsuccessfully verified first service data and reviewing or reporting the unsuccessfully verified first service data.

According to another aspect of some implementations of the present specification, a blockchain-based data verification method is provided, where the method is applied to a second verification system, and includes: obtaining second service data of a second service system and storing the second service data in a local database; receiving a verification request, the verification request including a first verification file; verifying first service data in the first verification file with the second service data in the local database and generating a verification result notification, and sending the verification result notification to a first verification system; and sending successfully verified second service data in the local database to a first blockchain node on a blockchain network.

In some implementations, the method further includes: before receiving the verification request, determining a verification rule corresponding to the second service data based on the second service data; determining a mapping relationship between the second service data and the verification rule; and storing the mapping relationship between the second service data and the verification rule in the local database.

In some implementations, the method further includes: after receiving the verification request of the first service system, extracting a first digital digest from the verification request and validating the first service data in the first verification file based on the first digital digest; and in response to the validating the first service data succeeding, verifying the first service data in the first verification file with the second service data in the local database.

In some implementations, verifying the first service data in the first verification file with the second service data in the local database and generating the verification result notification includes: determining the second service data corresponding to the first service data based on identification information in the first service data; obtaining a verification rule corresponding to critical service information in the second service data; and verifying the first service data with the second service data in the local database based on the verification rule and generating the verification result notification based on a verification result.

In some implementations, generating the verification result notification based on the verification result includes: generating a second verification file based on the verification result; processing the second verification file to generate a second digital digest; and generating the verification result notification based on the second verification file and the second digital digest.

In some implementations, generating the second verification file based on the verification result includes: if all of the first service data in the first verification file is successfully verified, updating a verification status in the first verification file and then generating the second verification file; and if unsuccessfully verified first service data exists in the second verification file, the generated second verification file includes the identification information, the verification status and a verification failure cause that are of each piece of the first service data in the first verification file.

According to another aspect of some implementations of the present specification, a computing device is provided, including: a memory, a processor, and a computer instruction stored in the memory and executable on the processor, where the steps of the blockchain-based data verification method are implemented when the processor executes the instruction.

According to another aspect of some implementations of the present specification, a computer-readable storage medium is provided, where the computer-readable storage medium stores a computer instruction, and the steps of the blockchain-based data verification method are implemented when the instruction is executed by a processor.

In some implementations of the present specification, the verification systems are established outside the service systems, so that a data verification method between institutions is changed as follows: the first service system sends transaction service data to the first verification system, the first verification file is generated in response to the number of pieces of the transaction service data received by the first verification system reaching the predetermined threshold, and the first verification file is sent to the second verification system for data verification. Without affecting normal interaction between the service systems, the data verification is completed through interaction between the verification systems, which improves efficiency of data verification and timeliness. The verified transaction service data is uploaded to the blockchain network, which ensures immutability and credibility of the data.

BRIEF DESCRIPTION OF DRAWINGS

FIG. 4 is a flowchart illustrating a blockchain-based data verification method according to some implementations of the present specification;

FIG. 5 is a flowchart illustrating a blockchain-based data verification method according to some implementations of the present specification.

DESCRIPTION OF IMPLEMENTATIONS

Many specific details are set forth in the following description to facilitate full understanding of the present application. However, the present application can be implemented in many different ways from those described herein, and a person skilled in the art can make similar promotion without departing from the content of the present application, so the present application is not limited to the specific implementations disclosed below.

The terms used in one or more implementations of the present specification are for the purpose of describing specific implementations only, and are not intended to limit one or more implementations of the present specification. The singular forms of "a", "said" and "the" used in one or more implementations of the present specification and the appended claims are also intended to include plural forms, unless other meanings are clearly indicated in the context. It should be further understood that the term "and/or" used in one or more implementations of the present specification refers to and includes any or all possible combinations of one or more associated listed items.

It should be understood that although the terms first, second, and the like may be used to describe various kinds of information in one or more implementations of the present specification, such information should not be limited to these terms. These terms are used only to differentiate information of a same type. For example, the first can also be referred to as the second without departing from the scope of one or more implementations of the present specification, and similarly, the second can also be referred to as the first. Depending on the context, the word "if" used herein can be interpreted as "when" or "while" or "in response to determining".

The present application provides a blockchain-based data verification system and method, a computing device and a storage medium, which are described in detail one by one in the following implementations.

Figure 1:
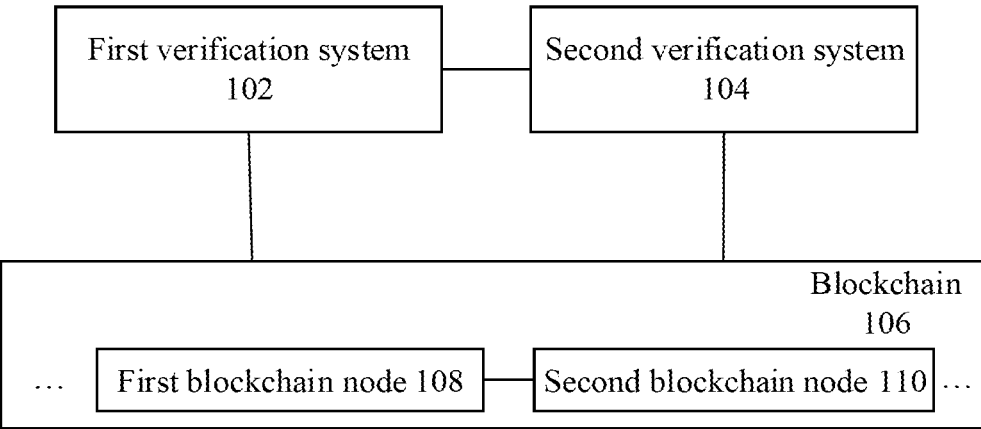
FIG. 1 is a schematic structural diagram illustrating a blockchain-based data verification system according to some implementations of the present specification.

FIG. 1 is a schematic structural diagram illustrating a blockchain-based data verification system according to some implementations of the present specification. The system includes: a first verification system 102, a second verification system 104, and a first blockchain node 108 and a second blockchain node 110 on a blockchain network 106.

The first verification system 102 is configured to: collect first service data based on a predetermined condition and generate a first verification file including the first service data, and send a verification request to the second verification system, the verification request including the first verification file.

In some implementations of the present specification, the first verification system is further configured to: obtain the first service data, store N pieces of the first service data as the first verification file in response to a number of pieces of the first service data reaching a predetermined threshold N and process the first verification file to generate a first digital digest, and send the verification request to the second verification system, the verification request including the first verification file and the first digital digest corresponding to the first verification file.

The second verification system 104 is configured to: receive second service data of a second service system and store the second service data in a local database, determine a verification rule corresponding to the second service data based on the second service data, determine a mapping relationship between the second service data and the verification rule, and store the mapping relationship between the second service data and the verification rule in the local database.

In some implementations of the present specification, the first service data and the second service data are transaction service data of a first service system and the second service system respectively, and the first verification file is a verification file generated in response to the number of pieces of the first service data obtained by the first verification system reaching N.

In some implementations of the present specification, the second service data can correspond to one or more verification rules, that is, the second service data and the verification rules can have a one-to-one mapping relationship or a one-to-many mapping relationship, which is not limited in the present specification.

The second verification system 104 is further configured to: receive the verification request, verify the first service data in the first verification file with the second service data in the local database and generate a verification result notification, send the verification result notification to the first verification system, and send successfully verified second service data in the local database to the first blockchain node on the blockchain network 106.

In some implementations of the present specification, the second verification system is further configured to: receive the verification request, extract the first digital digest from the verification request, and validate the first service data in the first verification file based on the first digital digest; and in response to the validating the first service data succeeding, determine the second service data corresponding to the first service data based on identification information in the first service data, obtain the verification rule corresponding to critical service information in the second service data, verify the first service data with the second service data in the local database based on the verification rule and generate the verification result notification, and send the verification result notification to the first verification system.

In some implementations of the present specification, the second verification system is further configured to: verify the first service data with the second service data in the local database based on the verification rule, generate a second verification file based on a result of the verifying the first service data with the second service data and process the second verification file to generate a second digital digest, and send the verification result notification to the first verification system, the verification result notification including the second verification file and the second digital digest corresponding to the second verification file.

In some implementations of the present specification, the second verification file is a verification file generated by the second verification system based on the verification result after verifying service data in the first verification file.

The first verification system 102 is further configured to: receive the verification result notification, and send successfully verified first service data to the second blockchain node 110 on the blockchain network 106.

In some implementations of the present specification, the first verification system is further configured to: if unsuccessfully verified first service data exists in the second verification file, update a verification status of the unsuccessfully verified first service data and review or report the unsuccessfully verified first service data.

The first blockchain node 108 corresponds to a node of the blockchain network 106 and is configured to receive and store the successfully verified second service data that is sent by the second verification system.

The second blockchain node 110 corresponds to a node of the blockchain network 106 and is configured to receive and store the successfully verified first service data that is sent by the first verification system.

In some implementations of the present specification, after receiving successfully verified data, the first blockchain node 108 and the second blockchain node 110 are further configured to: transmit the data to other blockchain nodes, for the blockchain nodes of the blockchain network to reach a consensus on successfully verified service data.

In practice, the first verification system and the second verification system can be banks, insurance companies, third-party transaction platforms or other transaction service platforms, both the first verification system and the second verification system can verify service data of other relevant service institutions, and data verification is not limited to be performed by two verification systems, and the data verification can be performed by two or more verification systems, which is not limited in the present specification.

In some implementations of the present specification, timeliness of the data verification can be realized by transmitting transaction data generated by the service systems to the verification systems, and by performing subsequent data verification through the verification systems. Unsuccessfully verified data can be reviewed or reported in time to ensure correctness of the service data. The successfully verified service data can be uploaded to the blockchain nodes by the verification systems, so that the blockchain nodes reach a consensus on the service data and store the service data in a blockchain of the blockchain network, which ensures authenticity and immutability of the data, and improves credibility of the transaction data.

Figure 2:
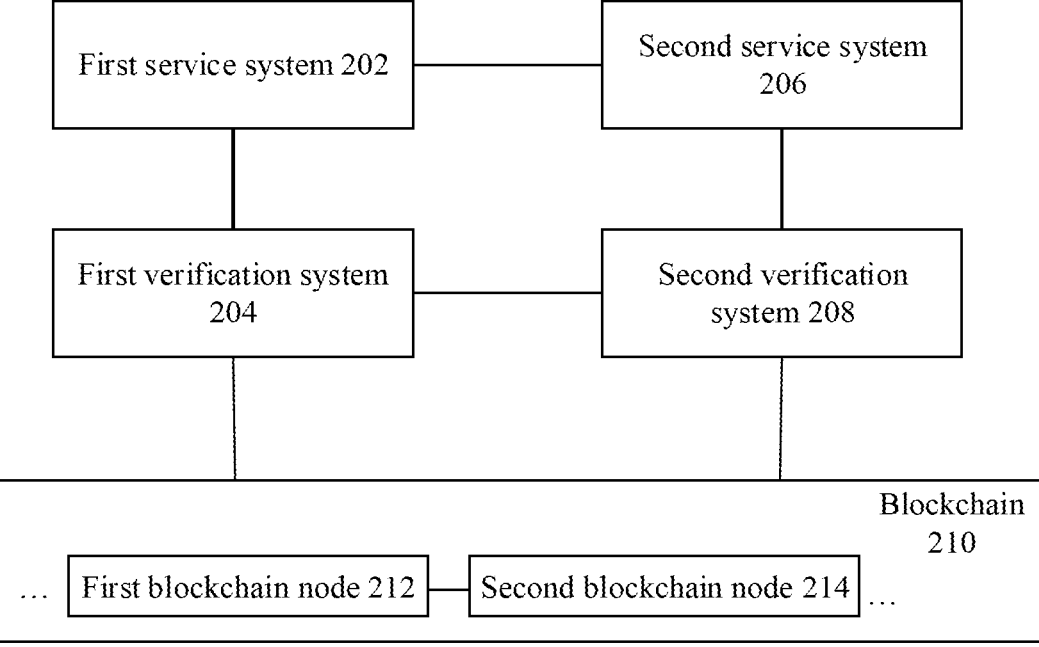
FIG. 2 is a schematic structural diagram illustrating a blockchain-based data verification system according to some implementations of the present specification.

FIG. 2 is a schematic structural diagram illustrating a blockchain-based data verification system according to some implementations of the present specification. The system includes: a first service system 202, a first verification system 204, a second service system 206, a second verification system 208, and a first blockchain node 212 and a second blockchain node 214 on a blockchain network 210.

The first service system 202 is configured to send first service data to the first verification system, and the first service data includes, for a piece of data, identification information of the piece of data, critical service information of the piece of data, and a verification status of the piece of data.

The first verification system 204 is configured to: collect the first service data of the first service system based on a predetermined condition and generate a first verification file including the first service data.

The second service system 206 is configured to send second service data to the second verification system, and the second service data includes, for a piece of data, identification information of the piece of data, critical service information of the piece of data, and a verification status of the piece of data.

The second verification system 208 is configured to: receive the second service data of the second service system, determine a verification rule corresponding to the second service data based on the second service data, determine a mapping relationship between the second service data and the verification rule, and store the mapping relationship between the second service data and the verification rule in a local database.

The first verification system 204 is further configured to send a verification request to the second verification system, and the verification request includes the first verification file.

In some implementations of the present specification, the first verification system is further configured to: obtain the first service data, store N pieces of the first service data as the first verification file in response to a number of pieces of the first service data reaching a predetermined threshold N and process the first verification file to generate a first digital digest, and send the verification request to the second verification system, the verification request including the first verification file and the first digital digest corresponding to the first verification file.

The second verification system 208 is configured to: receive the verification request, verify the first service data in the first verification file with the second service data in the local database and generate a verification result notification, send the verification result notification to the first verification system, and send successfully verified second service data in the local database to the first blockchain node on the blockchain network 210.

In some implementations of the present specification, the second verification system is further configured to: receive the verification request, extract the first digital digest from the verification request, and validate the first service data in the first verification file based on the first digital digest; and in response to the validating the first service data succeeding, determine the second service data corresponding to the first service data based on the identification information in the first service data, obtain the verification rule corresponding to the critical service information in the second service data, verify the first service data with the second service data in the local database based on the verification rule and generate the verification result notification, and send the verification result notification to the first verification system.

In some implementations of the present specification, the second verification system is further configured to: verify the first service data with the second service data in the local database based on the verification rule, generate a second verification file based on a result of the verifying the first service data with the second service data and process the second verification file to generate a second digital digest, and send the verification result notification to the first verification system, the verification result notification including the second verification file and the second digital digest corresponding to the second verification file.

The first verification system 204 is further configured to: receive the verification result notification, and send successfully verified first service data to the second blockchain node 214 on the blockchain network.

In some implementations of the present specification, the first verification system is further configured to: if unsuccessfully verified first service data exists in the second verification file, update the verification status of the unsuccessfully verified first service data and review or report the unsuccessfully verified first service data.

The first blockchain node 212 corresponds to a node of the blockchain network 210 and is configured to receive and store the successfully verified second service data that is sent by the second verification system.

The second blockchain node 214 corresponds to a node of the blockchain network 210 and is configured to receive and store the successfully verified first service data that is sent by the first verification system.

In some implementations of the present specification, the first blockchain node 212 and the second blockchain node 214 are further configured to: transmit successfully verified service data to other blockchain nodes, for the blockchain nodes of the blockchain network to reach a consensus on the successfully verified service data.

In some implementations of the present specification, real-time performance of service data verification is ensured by sending transaction service data of the service systems to the verification systems for subsequent data verification. Thereby, efficiency of the service data verification can be improved, and unsuccessfully verified data can be reviewed in time, which effectively ensures accuracy of the data.

Figure 3:
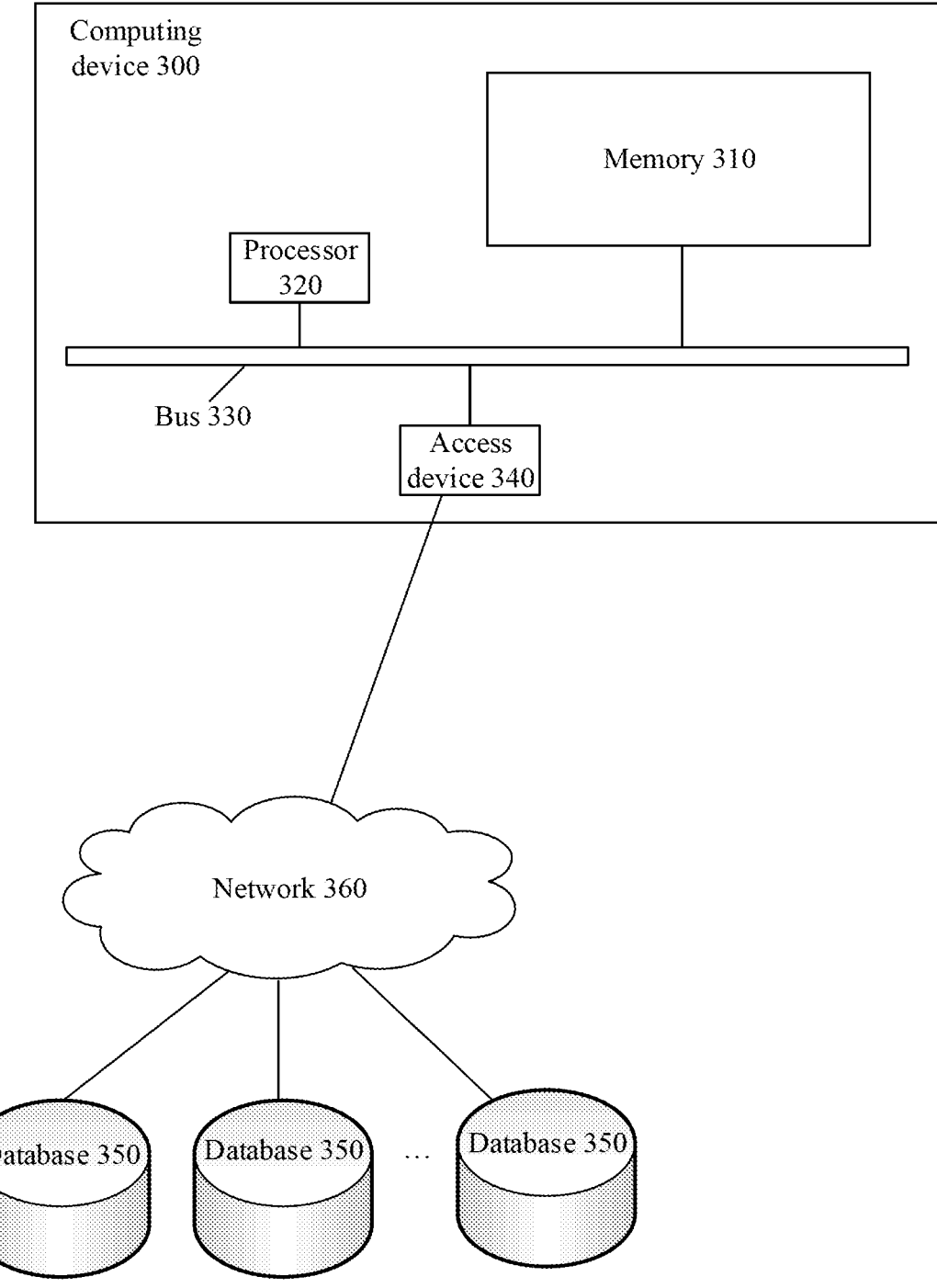
FIG. 3 is a structural block diagram illustrating a computing device according to some implementations of the present specification.

FIG. 3 is a structural block diagram illustrating a computing device 300 according to some implementations of the present specification. Components of the computing device 300 include, but are not limited to, a memory 310 and a processor 320. The processor 320 is connected to the memory 310 through a bus 330, and a database 350 is configured to store data.

The computing device 300 further includes an access device 340, and the access device 340 enables the computing device 300 to communicate through one or more networks 360. Examples of these networks include a public switched telephone network (PSTN), a local area network (LAN), a wide area network (WAN), a personal area network (PAN), or a combination of communication networks such as the Internet. The access device 340 can include one or more of any types of wired or wireless network interfaces (for example, a network interface card (NIC)), such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, a near field communication (NFC) interface, or the like.

In some implementations of the present specification, the above-described components of the computing device 300 and other components not shown in FIG. 3 can alternatively be connected to each other, for example, through a bus. It should be understood that the structural block diagram of the computing device shown in FIG. 3 is for an illustrative purpose only and is not intended to limit the scope of the present specification. A person skilled in the art can add or replace other components as required.

The computing device 300 can be any type of stationary or mobile computing device, including a mobile computer or a mobile computing device (for example, a tablet computer, a personal digital assistant, a laptop computer, a notebook computer, a netbook, or the like), a mobile phone (for example, a smartphone), a wearable computing device (for example, a smart watch, smart glasses, or the like), or another type of mobile device, or a stationary computing device such as a desktop computer or a PC. The computing device 300 can alternatively be a mobile or stationary server.

The processor 320 can perform steps in a blockchain-based data verification method shown in FIG. 4. FIG. 4 is a flowchart illustrating a blockchain-based data verification method according to some implementations of the present specification. The method includes step 402 to step 406.

Step 402: Collect first service data based on a predetermined condition and generate a first verification file including the first service data, the first service data including, for a piece of data, identification information of the piece of data, critical service information of the piece of data, and a verification status of the piece of data.

In some implementations of the present specification, the predetermined condition is a predetermined number of pieces of transaction data. In practice, the predetermined condition can alternatively be specific predetermined duration, which is not limited in the present application.

In some implementations of the present specification, a predetermined threshold N is a positive integer, and a size of N can be determined based on an actual situation.

The first service data can further include transaction time and a transaction amount. For example, the predetermined threshold N is equal to 3. Assuming that the first service data is service data generated by an Internet insurance sales platform transaction, and first service data collected by a first verification system is listed in the form of a table, the first verification file is shown in Table 1:

TABLE 1

| Identification information | Transaction time | Transaction amount | Critical service information | Verification status |
|---|---|---|---|---|
| User B-Platform A | Feb. 3, 2019 13:23 | 5,000 yuan | User B purchases a personal accident insurance with a policy number of A00001 on platform A. | Unverified |
| User C-Platform A | Feb. 10, 2019 09:15 | 3,600 yuan | User C purchases a vehicle insurance with a policy number of C00101 on platform A. | Unverified |
| User D- | Feb. 10, 2019 | 4,000 yuan | User D purchases a health | Unverified |

TABLE 1-continued

| Identification information | Transaction time | Transaction amount | Critical service information | Verification status |
|---|---|---|---|---|
| Platform A | 15:08 | | insurance with a policy number of D10001 on platform A. | |

Information in Table 1 includes: transaction identification information, the transaction time, the transaction amount, critical information of transaction, and a verification status of transaction data. After the first verification file is generated, the first verification file is processed to obtain a first digital digest, and the first verification file and the first digital digest are sent to a second verification system for data verification.

Step 404: Send a verification request to the second verification system, the verification request including the first verification file.

In some implementations of the present specification, the verification request further includes the first digital digest corresponding to the first verification file. After receiving the verification request, the second verification system can validate the first verification file based on the first digital digest to ensure that the first verification file is not tampered with. In response to the validating the first verification file succeeding, second service data corresponding to the first service data is searched for based on the identification information of the first service data, the first service data in the first verification file is verified based on a verification rule of the second service data, and a second verification file is generated based on a verification result.

Step 406: Receive a verification result notification sent by the second verification system, and send successfully verified first service data to a second blockchain node.

In some implementations of the present specification, the second verification system generates the second verification file based on the verification result, processes the second verification file to generate a second digital digest, and sends the second verification file and the second digital digest to the first verification system. The first verification system can validate the second verification file based on the second digital digest to ensure that the second verification file is not tampered with.

If all of the first service data in the first verification file is successfully verified, the second verification file generated based on the verification result is shown in Table 2:

TABLE 2

| Identification information | Transaction time | Transaction amount | Critical information | Verification status |
|---|---|---|---|---|
| User B-Institution A | Feb. 3, 2019 13:23 | 5,000 yuan | User B purchases a personal accident insurance with a policy number of A00001 on platform A. | Successfully verified |
| User C-Institution A | Feb. 10, 2019 09:15 | 3,600 yuan | User C purchases a vehicle insurance with a policy number of C00101 on platform A. | Successfully verified |
| User D-Institution A | Feb. 10, 2019 15:08 | 4,000 yuan | User D purchases a health insurance with a policy number of D10001 on platform A. | Successfully verified |

In some implementations of the present specification, if all of the first service data in the first verification file is successfully verified, the second verification file is shown in Table 2, and only the verification status is changed on the basis of Table 1.

If the first service data in the first verification file includes unsuccessfully verified service data, the second verification file is shown in Table 2.

In some implementations of the present specification, if the first verification file includes unsuccessfully verified service data, the second verification file is shown in Table 3.

TABLE 3

| Identification information | Verification status | Verification failure cause |
|---|---|---|
| User B-Institution A | Successfully verified | None |
| User C-Institution A | Successfully verified | None |
| User D-Institution A | Unsuccessfully verified | No matching transaction service data is identified |

Information in the second verification file includes: the identification information, a validation result, and the verification failure cause. The first verification system updates the verification status of the unsuccessfully verified service data, and reviews or reports the unsuccessfully verified service data.

In some implementations of the present specification, setting a reasonable service data number threshold in the first verification system not only can ensure real-time verification of the service data, but also can avoid pressure on the service systems caused by excessive service data to be verified, thereby effectively improving working efficiency.

FIG. 5 shows a blockchain-based data verification method according to some implementations of the present specification. The method includes step 502 to step 508.

Step 502: Obtain second service data of a second service system and store the second service data in a local database.

In some implementations of the present specification, the second service data is transaction service data generated by the second service system. The second service data includes, for a piece of transaction service data, identification information of the piece of transaction service data, critical service information of the piece of transaction service data, and a verification status of the piece of transaction service data, and can further include information such as transaction time and a transaction amount.

In some implementations of the present specification, after obtaining the second service data, a second verification system needs to determine a verification rule corresponding to the second service data based on the second service data, determine a mapping relationship between the second service data and the verification rule, and store the mapping relationship between the second service data and the verification rule in the local database.

An insurance service is still used as an example, the second service data obtained by the second service system is still listed in the form of a table, and it is assumed that the obtained second service data is shown in Table 4:

TABLE 4

| Identification information | Transaction time | Transaction amount | Critical information | Verification status |
|---|---|---|---|---|
| Institution A-User B | Feb. 3, 2019 13:23 | 5,000 yuan | Institution A sells a personal accident insurance with a policy number of A00001 to user B. | Unverified |

Information that can be obtained from Table 4 is: on Feb. 3, 2019, institution A sold a personal accident insurance to user B, the policy number is A00001, the transaction amount is 5,000 yuan, and this piece of transaction information had not been verified. A verification rule for this piece of transaction information determined by the second verification system based on content of this piece of transaction information is as follows: the transaction time, the transaction amount and the verification status need to be consistent with those in Table 4, and the identification information and the critical information need to correspond to those in Table 4.

Step 504: Receive a verification request, the verification request including a first verification file.

In some implementations of the present specification, N pieces of first service data are stored as the first verification file in response to a number of pieces of the first service data obtained by a first verification system reaching a predetermined threshold N, and the first verification file is processed to generate a first digital digest, and the first verification file and the first digital digest are sent to the second verification system. The second verification system can validate the first verification file based on the first digital digest to ensure that the first verification file is not tampered with.

Step 506: Verify the first service data in the first verification file with the second service data in the local database and generate a verification result notification, and send the verification result notification to the first verification system.

In some implementations of the present specification, after receiving the verification request and successfully validating the first verification file, the second verification system determines the corresponding second service data based on identification information of the first service data in the first verification file, and verifies the first service data based on the verification rule corresponding to the second service data. If information about the first service data complies with the above-described verification rule, the verification succeeds; if at least one piece of information of the first service data does not comply with the above-described verification rule, the verification fails.

A second verification file is generated based on a verification result, the second verification file is processed to generate a second digital digest, and the second verification file and the second digital digest are sent to the first verification system. The first verification system can validate the second verification file based on the second digital digest to ensure that the second verification file is not tampered with.

Step 508: Send successfully verified second service data in the local database to a first blockchain node on a blockchain network.

In some implementations of the present specification, after receiving successfully verified service data, the first blockchain node and a second blockchain node transmit the successfully verified service data to other blockchain nodes, for the blockchain nodes of the blockchain network to reach a consensus on successfully verified first service data.

Figure 6:
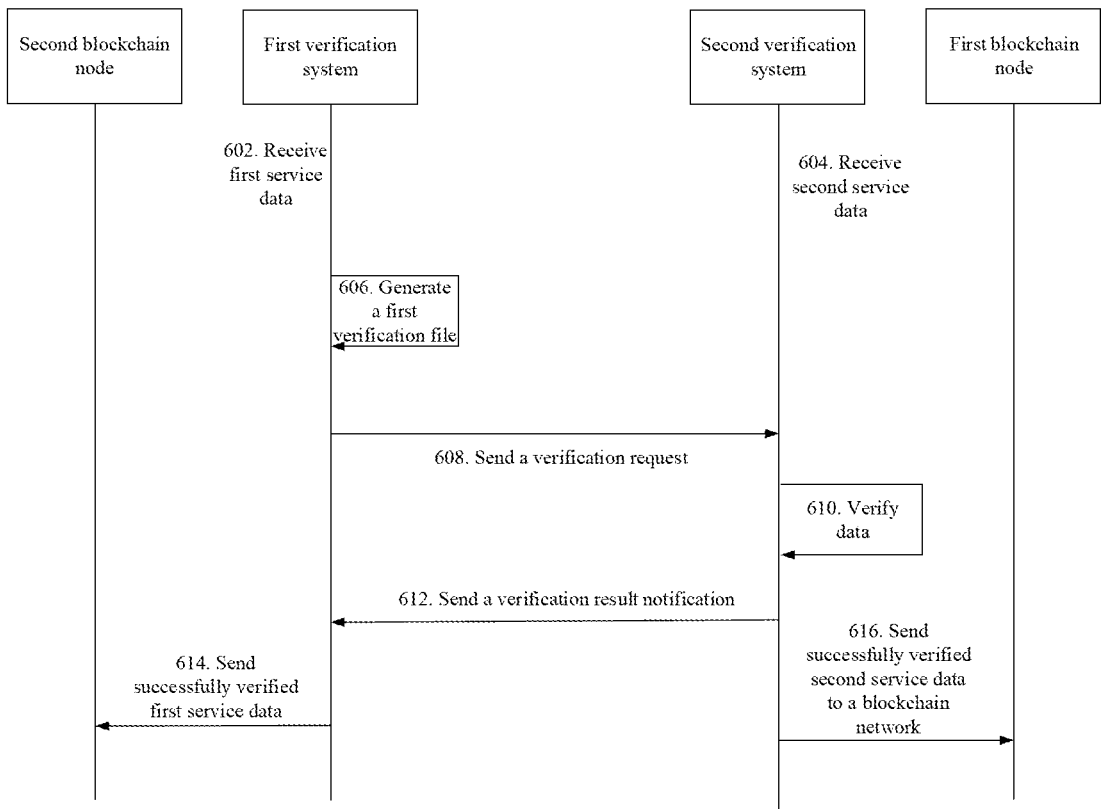
FIG. 6 is a schematic interactive diagram illustrating a blockchain-based data verification method according to some implementations of the present specification.

FIG. 6 is a schematic interactive diagram illustrating a blockchain-based data verification method according to some implementations of the present specification. The method includes step 602 to step 616.

Step 602: A first verification system receives first service data from a first service system.

Step 604: A second verification system receives second service data from a second service system.

In some implementations of the present specification, the first service data and the second service data each include, for a piece of data, identification information of the piece of data, critical service information of the piece of data, and a verification status of the piece of data, and further include transaction time and a transaction amount.

Step 606: The first verification system collects the first service data based on a predetermined condition and generates a first verification file including the first service data.

In some implementations of the present specification, the predetermined condition is a predetermined number of pieces of transaction data. A predetermined number threshold N is a positive integer, and a size of N can be determined based on an actual situation.

N pieces of the first service data are stored as the first verification file in response to the number of pieces of the first service data obtained by the first verification system reaching a predetermined threshold N, and the first verification file is processed to generate a first digital digest, and the first verification file and the first digital digest are sent to the second verification system. The second verification system can validate the first verification file based on the first digital digest to ensure that the first verification file is not tampered with.

Step 608: The first verification system sends a verification request to the second verification system.

In some implementations of the present specification, the verification request further includes the first digital digest corresponding to the first verification file. After receiving the verification request, the second verification system can validate the first verification file based on the first digital digest. In response to the validating the first verification file succeeding, the second service data corresponding to the first service data is searched for based on the identification information of the first service data, the first service data in the first verification file is verified based on a verification rule for the second service data, and a second verification file is generated based on a verification result.

Step 610: The second verification system verifies the first service data.

In some implementations of the present specification, after obtaining the second service data, the second verification system needs to determine the verification rule corresponding to the second service data based on the second service data, determine a mapping relationship between the second service data and the verification rule, and store the mapping relationship between the second service data and the verification rule in a local database.

In some implementations of the present specification, after receiving the verification request and successfully validating the first verification file, the second verification system determines the corresponding second service data based on the identification information of the first service data in the first verification file, and verifies the first service data based on the verification rule corresponding to the second service data. If information of the first service data complies with the above-described verification rule, the verification succeeds; if at least one piece of information of the first service data does not comply with the above-described verification rule, the verification fails.

The second verification file is generated based on a verification result, the second verification file is processed to generate a second digital digest, and the second verification file and the second digital digest are sent to the first verification system. The first verification system can validate the second verification file based on the second digital digest to ensure that the second verification file is not tampered with.

Step 612: The second verification system sends a verification result notification to the first verification system.

In some implementations of the present specification, the second verification system generates the second verification file based on the verification result, processes the second verification file to generate a second digital digest, and sends the second verification file and the second digital digest to the first verification system. The first verification system can validate the second verification file based on the second digital digest to ensure that the second verification file is not tampered with.

Step 614: The first verification system sends successfully verified first service data to a second blockchain node.

Step 616: The second verification system sends successfully verified second service data to a first blockchain node.

In some implementations of the present specification, after receiving successfully verified service data, the first blockchain node and the second blockchain node transmit the successfully verified service data to other blockchain nodes, for the blockchain nodes of the blockchain network to reach a consensus on the successfully verified first service data.

In some implementations of the present specification, the verification systems are established outside the service systems. Without affecting normal interaction between the service systems, data verification is completed through interaction between the verification systems, which improves efficiency of data verification and timeliness. In addition, the verified transaction service data is uploaded to a blockchain of a blockchain network, which ensures immutability and credibility of the data.

Some implementations of the present specification further provide a computing device, including: a memory, a processor, and a computer instruction stored in the memory and executable on the processor, where the steps of the blockchain-based data verification method are implemented when the processor executes the instruction.

Some implementations of the present application further provide a computer-readable storage medium, where the computer-readable storage medium stores a computer instruction, and the steps of the above-described blockchain-based data verification method are implemented when the instruction is executed by a processor.

The schematic solution for the computer-readable storage medium in these implementations has been described above. It should be noted that the technical solution of the storage medium belongs to the same concept as the technical solution of the above-described blockchain-based data verification method. For details that are not described in detail in the technical solution of the storage medium, references can be made to the description of the technical solution of the above-described blockchain-based data verification method.

Specific implementations of the present specification have been described above. Other implementations fall within the scope of the appended claims. In some situations, the actions or steps described in the claims can be performed in an order different from the order in the implementations and the desired results can still be achieved. In addition, the process depicted in the accompanying drawings does not necessarily require a particular execution order to achieve the desired results. In some implementations, multi-tasking and parallel processing can be advantageous.

The computer instruction includes computer program code, which can be in a source code form, an object code form, an executable file or a certain intermediate form, or the like. The computer-readable medium can include any entity or device capable of including the computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, or the like. It should be noted that the content contained in the computer-readable medium can be appropriately increased or decreased in accordance with the requirements of the legislation and patent practice in the jurisdiction, for example, in some jurisdictions, the computer-readable medium does not include electrical carrier signals and telecommunications signals in accordance with the legislation and patent practice.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 7:
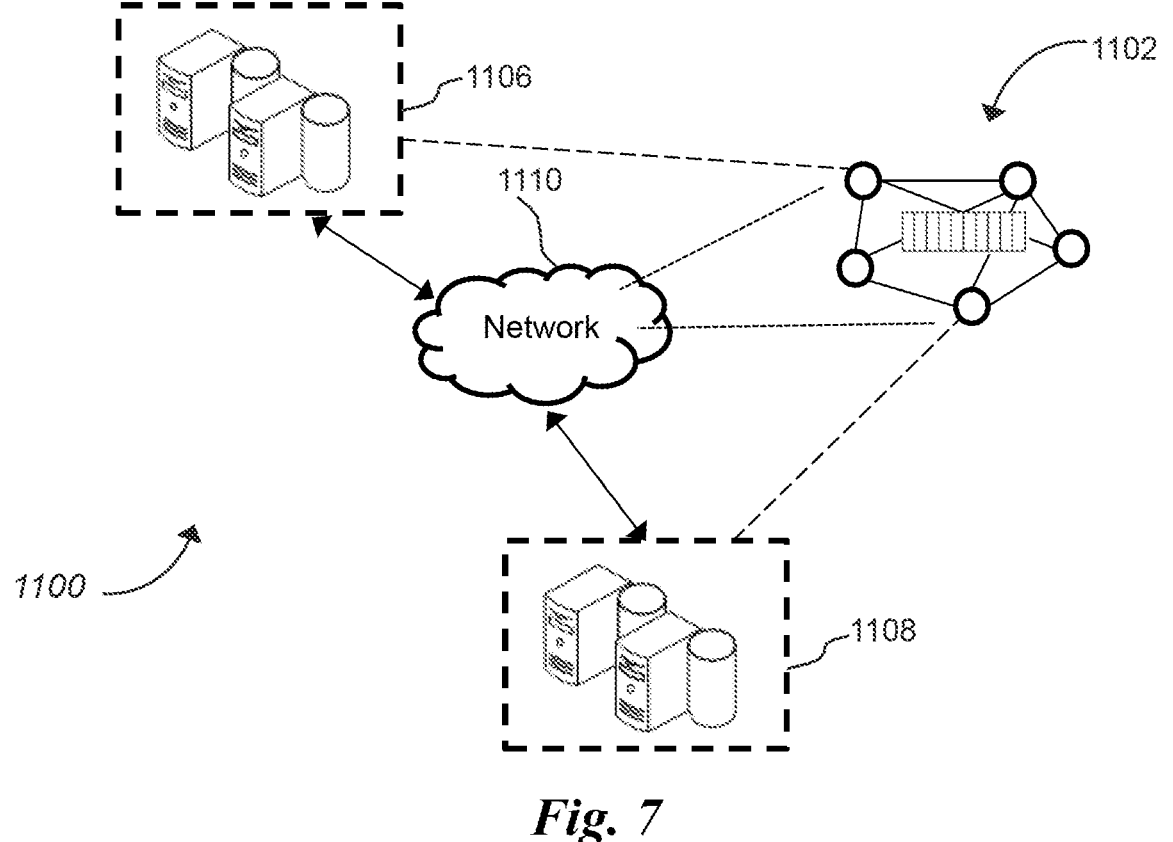
FIG. 7 is a diagram illustrating example environments that can be used to execute implementations of this specification.

FIG. 7 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 7, the consortium blockchain network 1102 is represented as a peer-to-peer network of nodes, and the computing systems 1106, 1108 provide nodes of the first entity and second entity, respectively, which participate in the consortium blockchain network 1102.

Figure 8:
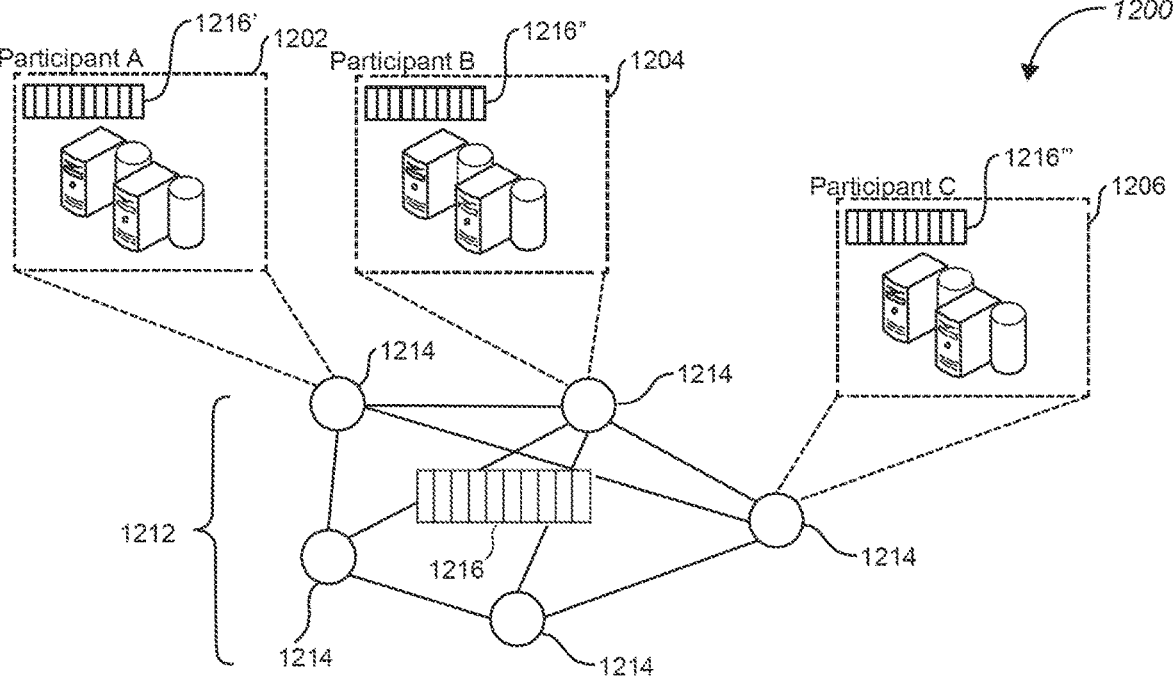
FIG. 8 is a diagram illustrating an example architecture in accordance with implementations of this specification.

FIG. 8 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 8, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 8, the participant systems 1202, 1204 store respective, complete copies 1216', 1216", 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes". The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 8, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 8, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 8, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

It should be noted that, for the sake of simplicity of description, the above-described method implementations are described as a series of action combinations, but a person skilled in the art should appreciate that the present application is not limited by the described action order, because some steps can be performed in other orders or at the same time according to the present application. In addition, a person skilled in the art should also appreciate that the implementations described in the present specification are example implementations and that the actions and modules involved are not necessarily required by the present application.

In the above-described implementations, the descriptions of the implementations have respective focuses. For a part that is not described in detail in some implementations, references can be made to related descriptions in other implementations.

The example implementations of the present application disclosed above are intended only to aid in the elaboration of the present application. The optional implementations do not describe all the details in detail, nor do they limit the present invention to the specific implementations described. Clearly, many modifications and changes can be made according to the content of the present specification. These implementations are selected and described in detail in the present specification in order to better explain the principles and practical applications of the present application, so that a person skilled in the art can well understand and use the present application. The present application is limited only by the claims and their full scope and equivalents.

What is claimed is:

1. A blockchain-based data verification method, comprising:

collecting, by a first verification system implemented by a first computing system, from a first service system, first transaction data of a transaction;

generating, by the first verification system, a first verification file including the first transaction data and a first digital code based on the first verification file, the first transaction data including, identification information related to the transaction, service information related to the transaction, and a verification status related to the transaction, the first digital code being different from each one of the first verification file or the first transaction data;

sending, by the first verification system via a communication link outside of a blockchain network, a verification request to a second verification system implemented by a second computing system, the verification request including the first verification file and the first digital code and requesting the second verification system to verify the first transaction data;

verifying, by the second verification system, the first transaction data including validating authenticity of the first verification file based on the first digital code;

matching the first transaction data with a second transaction data of the transaction stored at a database associated with the second verification system and collected by the second verification system from a second service system, the second transaction data different from the first transaction data;

receiving, by the first verification system through the communication link outside of the blockchain network, a verification result notification sent by the second verification system and sending the first transaction data to a first blockchain node of the blockchain network based on the verification result notification; and updating a blockchain of the blockchain network by adding the first transaction data to the blockchain based on the verification result, wherein the blockchain network includes a consensus mechanism configured to reach a consensus on the first transaction data and the second transaction data sent by the first verification system and the second verification system, respectively, based on that the verifying the first transaction data conducted outside of the blockchain network is successful, and wherein the first verification system and the second verification system are both outside of the blockchain network.

2. The method according to claim 1, wherein the first verification file includes a plurality of pieces of first transaction data.

3. The method according to claim 1, wherein the verification result notification includes a second verification file and a second digital code corresponding to the second verification file; and wherein the receiving the verification result notification sent by the second verification system and sending the first transaction data to the first blockchain node includes:

extracting the second verification file and the second digital code that are included in the verification result notification, and validating the second verification file based on the second digital code;

in response to that the validating the second verification file succeeds, extracting successfully verified first transaction data in the second verification file and uploading the successfully verified first transaction data to the first blockchain node on a blockchain network; and in response to the second verification file includes unsuccessfully verified first transaction data, updating a verification status of the unsuccessfully verified first transaction data and reviewing or reporting the unsuccessfully verified first transaction data.

4. The method of claim 1, wherein the first transaction data is collected from the first service system that conducts a first portion of the transaction.

5. The method of claim 1, wherein the second verification system sends the second transaction data locally stored at the second verification system to a second blockchain node after the verifying the first transaction data is successful.

6. The method of claim 5, wherein the second verification system verifies the second transaction data based on a result of verifying the first transaction data.

7. The method of claim 5, wherein the second verification system collects the second transaction data from the second service system that conduct a second portion of the transaction.

8. The method of claim 1, wherein the collecting the first transaction data includes collecting the first transaction data after the first verification system determining that a number of pieces of the first transaction data reaches a threshold number.

9. A blockchain-based data verification method, comprising:

at a second verification system implemented by a second computing system, obtaining, by a second verification system implemented by a second computing system, second transaction data from a second service system;

storing, by the second verification system, the second transaction data in a database associated with the second verification system;

receiving, by the second verification system via a communication link outside of a blockchain network, a verification request from a first verification system implemented by a first computing system, the verification request including a first verification file and a first digital code generated based on the first verification file, the first verification file including first transaction data, the first digital code being different from each one of the first verification file or the first transaction data;

verifying, by the second verification system, the first transaction data in the first verification file, the verifying the first transaction data including:

validating authenticity of the first transaction data using the first digital code, matching the first transaction data with the second transaction data stored in the database associated with the second verification system, the first transaction data and the second transaction data are different from one another, and generating a verification result notification;

sending, by the second verification system via the communication link outside of the blockchain network, the verification result notification to the first verification system, the verification result notification causing the first verification system to send the first transaction data to a second blockchain node on a blockchain network; and sending, by the second verification system, the second transaction data in the local database to a first blockchain node on the blockchain network based on the matching the first transaction data with the second transaction data is successful, the sending the second transaction data causing the blockchain network to implement a consensus mechanism to reach a consensus on the first transaction data and the second transaction data sent by both the first verification system and the second verification system, respectively, based on that the verifying the first transaction data conducted outside of the blockchain network is successful, and wherein the first verification system and the second verification system are both outside of the blockchain network.

10. The method according to claim 9, further comprising:

before the receiving the verification request, determining a verification rule corresponding to the second transaction data based on the second transaction data;

determining a mapping relationship between the second transaction data and the verification rule; and storing the mapping relationship between the second transaction data and the verification rule in the local database.

11. The method according to claim 9, wherein the verifying the first transaction data includes:

after the receiving the verification request from the first verification system, extracting the first digital code from the verification request;

validating the first transaction data in the first verification file based on the first digital code; and in response to that the validating the first transaction data succeeds, verifying the first transaction data in the first verification file with the second transaction data in the local database.

12. The method according to claim 9, wherein the verifying the first transaction data in the first verification file with the second transaction data in the local database includes:

determining the second transaction data corresponding to the first transaction data based on identification information in the first transaction data;

obtaining a verification rule corresponding to service information in the second transaction data; and verifying the first transaction data with the second transaction data corresponding to the first transaction data based on the verification rule.

13. The method according to claim 12, wherein generating the verification result notification based on the verification result includes:

generating a second verification file based on the verification result;

processing the second verification file to generate a second digital code; and generating the verification result notification based on the second verification file and the second digital code.

14. The method according to claim 13, wherein the generating the second verification file based on the verification result includes:

in response to all of the first transaction data in the first verification file is successfully verified, updating a verification status in the first verification file and generating the second verification file; and in response to the second verification file includes unsuccessfully verified first transaction data, the second verification file includes identification information, a verification status, and a verification failure cause for each piece of the unsuccessfully verified first transaction data.

15. A computing device, comprising a processor and a memory having executable instruction stored thereon, which when executed by the processor enable the processor to implement acts including:

obtaining second transaction data from a second service system;

storing the second transaction data in a database associated with the computing device;

receiving, via a communication link outside of a blockchain network, a verification request from a first verification system, the verification request including a first verification file and a digital code generated based on the first verification file, the first verification file including a first transaction data, the first digital code being different from each one of the first verification file or the first transaction data;

verifying the first transaction data in the first verification file, the verifying the first transaction data including:

validating authenticity of the first transaction data using first digital code, and matching the first transaction data with the second transaction data in the database associated with the computing device, the first transaction data and the second transaction data are different from one another;

generating a verification result notification based on a result of the verifying the first transaction data with the second transaction data;

sending, via the communication link outside of the blockchain network, the verification result notification to the first verification system, the verification result notification causing the first verification system to send the first transaction data to a second blockchain node on a blockchain network based on the verification result notification; and sending the second transaction data in the local database to a first blockchain node on the blockchain network based on the result of the verifying the first transaction data with the second transaction data, wherein the blockchain network includes a consensus mechanism configured to reach a consensus on the first transaction data and the second transaction data sent by the first verification system and the second verification system, respectively, based on that the verifying the first transaction data conducted outside of the blockchain network is successful, and wherein the first verification system and the second verification system are both outside of the blockchain network.

16. The computing device according to claim 15, wherein the acts further include:

before the receiving the verification request, determining a verification rule corresponding to the second transaction data based on the second transaction data;

determining a mapping relationship between the second transaction data and the verification rule; and storing the mapping relationship between the second transaction data and the verification rule in the local database.

17. The computing device according to claim 15, wherein the verifying the first transaction data include:

after the receiving the verification request from the first service system, extracting the first digital code from the verification request;

validating the first transaction data in the first verification file based on the first digital code; and in response to that the validating the first transaction data succeeds, verifying the first transaction data in the first verification file with the second transaction data in the local database.

18. The computer device according to claim 15, wherein the verifying the first transaction data in the first verification file with the second transaction data in the local database includes:

determining the second transaction data corresponding to the first transaction data based on identification information in the first transaction data;

obtaining a verification rule corresponding to service information in the second transaction data; and verifying the first transaction data with the second transaction data corresponding to the first transaction data based on the verification rule.

19. The computing device according to claim 18, wherein the generating the verification result notification based on the verification result includes:

generating a second verification file based on the verification result;

processing the second verification file to generate a second digital code; and generating the verification result notification based on the second verification file and the second digital code.

20. The computing device according to claim 19, wherein the generating the second verification file based on the verification result includes:

in response to all of the first transaction data in the first verification file is successfully verified, updating a verification status in the first verification file and generating the second verification file; and in response to the second verification file includes unsuccessfully verified first transaction data, the second verification file includes identification information, a verification status, and a verification failure cause for each piece of the unsuccessfully verified first transaction data.

* * * * *